(12) United States Patent
Morjaria et al.

(10) Patent No.: US 8,150,641 B2
(45) Date of Patent: Apr. 3, 2012

(54) SYSTEM, DEVICE, AND METHOD FOR ESTIMATING POSSIBLE POWER OUTPUT OF WIND TURBINES

(75) Inventors: Mahesh A. Morjaria, Marietta, GA (US); Vineel Gujjar, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/961,269

(22) Filed: Dec. 6, 2010

(65) Prior Publication Data
US 2011/0224926 A1 Sep. 15, 2011

(51) Int. Cl.
*G01R 21/00* (2006.01)
(52) U.S. Cl. ......................................................... 702/60
(58) Field of Classification Search .................... 702/60, 702/64, 65, 81, 96, 104, 142, 147, 179, 182, 702/183, 188; 290/44
See application file for complete search history.

(56) References Cited

U.S. PATENT DOCUMENTS

| | | | |
|---|---|---|---|
| 6,924,565 B2 | 8/2005 | Wilkins et al. | |
| 7,274,975 B2 | 9/2007 | Miller | |
| 7,351,033 B2 | 4/2008 | McNerney | |
| 7,523,001 B2 * | 4/2009 | Morjaria et al. | 702/3 |
| 7,679,215 B2 | 3/2010 | Delmerico et al. | |
| 2006/0273595 A1 * | 12/2006 | Avagliano et al. | 290/44 |
| 2007/0124025 A1 | 5/2007 | Schram et al. | |
| 2009/0218818 A1 | 9/2009 | Cardinal et al. | |
| 2009/0218819 A1 | 9/2009 | Miller et al. | |
| 2010/0262309 A1 | 10/2010 | Currie et al. | |

* cited by examiner

*Primary Examiner* — Mohamed Charioui
(74) *Attorney, Agent, or Firm* — James McGinness, Esq.; Armstrong Teasdale LLP (57) ABSTRACT

A method for use in calculating a possible power output of a wind turbine. A series of performance data samples is acquired. Each performance data sample includes a meteorological condition and a power output indicated at a first time by one or more sensors associated with a wind turbine. A transfer function is calculated based at least in part on the series of performance data samples. The transfer function relates power output to the meteorological condition. A possible power output is calculated based on the transfer function and at least one meteorological condition indicated by the one or more sensors at a second time.

20 Claims, 7 Drawing Sheets

SYSTEM, DEVICE, AND METHOD FOR ESTIMATING POSSIBLE POWER OUTPUT OF WIND TURBINES

BACKGROUND OF THE INVENTION

The subject matter described herein relates generally to operating wind turbines and, more particularly, to determining a possible power output of one or more wind turbines when the wind turbines are operating in a curtailed state.

Wind turbines utilize wind energy to generate or produce electrical power. Multiple wind turbines may be installed at a site to form a wind farm. At times, the operator of a wind farm may operate wind turbines in the farm at a curtailed level of operation (i.e., less than a maximum level of operation). For example, curtailed operation may be necessary to meet a maximum power output requested by the operator of a power grid to which the wind farm is connected.

The wind farm operator may be entitled by a contractual, regulatory, or other obligation to compensation for revenue lost due to curtailment. Accordingly, the grid operator may wish to accurately estimate such lost revenue. Further, the wind farm operator may wish to determine an amount of excess capacity for power production when one or more wind turbines is operating in a curtailed state.

BRIEF DESCRIPTION OF THE INVENTION

In one aspect, a method for use in calculating a possible power output of a wind turbine is provided. The method includes acquiring a series of performance data samples. Each performance data sample includes a meteorological condition and a power output indicated at a first time by one or more sensors associated with a wind turbine. A transfer function is calculated by a computing system based at least in part on the series of performance data samples. The transfer function relates power output to the meteorological condition. A possible power output is calculated by the computer system based on the transfer function and at least one meteorological condition indicated by the one or more sensors at a second time.

In another aspect, a device for use in calculating a possible power output of a wind turbine is provided. The device includes a sensor interface that is configured to receive an operating condition and a power output at a plurality of first times from one or more sensors associated with a wind turbine. The device also includes a memory device that is coupled in communication with the sensor interface and configured to store a series of performance data samples that include an operating condition and a power output. The device further includes a processor that is coupled in communication with the memory device and programmed to calculate a transfer function relating power output to the operating condition based at least in part on the series of performance data samples, and to calculate a possible power output based on the transfer function and an operating condition received by the sensor interface at a second time.

In yet another aspect, one or more computer-readable storage media having computer-executable instructions embodied thereon are provided. When executed by at least one processor, the computer-executable instructions cause the processor to calculate a transfer function relating power output of a wind turbine to a meteorological condition based at least in part on a series of performance data samples. Each performance data sample includes a power output of the wind turbine and a meteorological condition of the wind turbine that are indicated while the wind turbine is operated in a non-curtailed state. The computer-executable instructions further cause the processor to calculate a possible power output of the wind turbine based at least in part on the transfer function and a meteorological condition of the wind turbine indicated while the wind turbine is operated in a curtailed state.

DETAILED DESCRIPTION OF THE INVENTION

The embodiments described herein facilitate determining a difference between a possible or potential power output and an actual, measured power output for one or more wind turbines. Possible power output may be calculated using a transfer function that relates power output to one or more operating conditions. Operating conditions include, without limitation, meteorological conditions, mechanical conditions, and any other factors that may affect wind turbine power output. A meteorological condition may include, for example, a wind speed, a wind direction, an air temperature, an air density, a humidity level, and/or an air pressure.

In an exemplary embodiment, a transfer function is created from data sampled while a wind turbine is operating in a normal, non-curtailed state. The transfer function may be calculated repeatedly, such that the transfer function reflects changes in the relationship between power output and an operating condition over time. The same operating conditions used to create the transfer function may be used in combination with the transfer function to estimate a possible power production of a wind turbine operating in a curtailed state. Accordingly, embodiments described herein enable a possible power calculation to be applied when a wind turbine is curtailed, and further enable the accuracy of the possible power calculation to be evaluated and/or improved when the wind turbine is not curtailed. When the wind turbine is not curtailed, both predicted and measured power outputs may be available. Moreover, the methods described may be applied to a plurality of wind turbines within a wind farm.

An exemplary technical effect of the methods, system, and apparatus described herein includes at least one of: (a) acquiring a series of performance data samples, wherein each performance data sample of the plurality of performance data samples includes an operating condition and a power output indicated at a first time by one or more sensors associated with a wind turbine; (b) calculating a transfer function based at least in part on the series of performance data samples, wherein the transfer function relates power output to the operating condition; and (c) calculating a possible power output based on the transfer function and at least one operating condition indicated by the one or more sensors at a second time.

Figure 1:
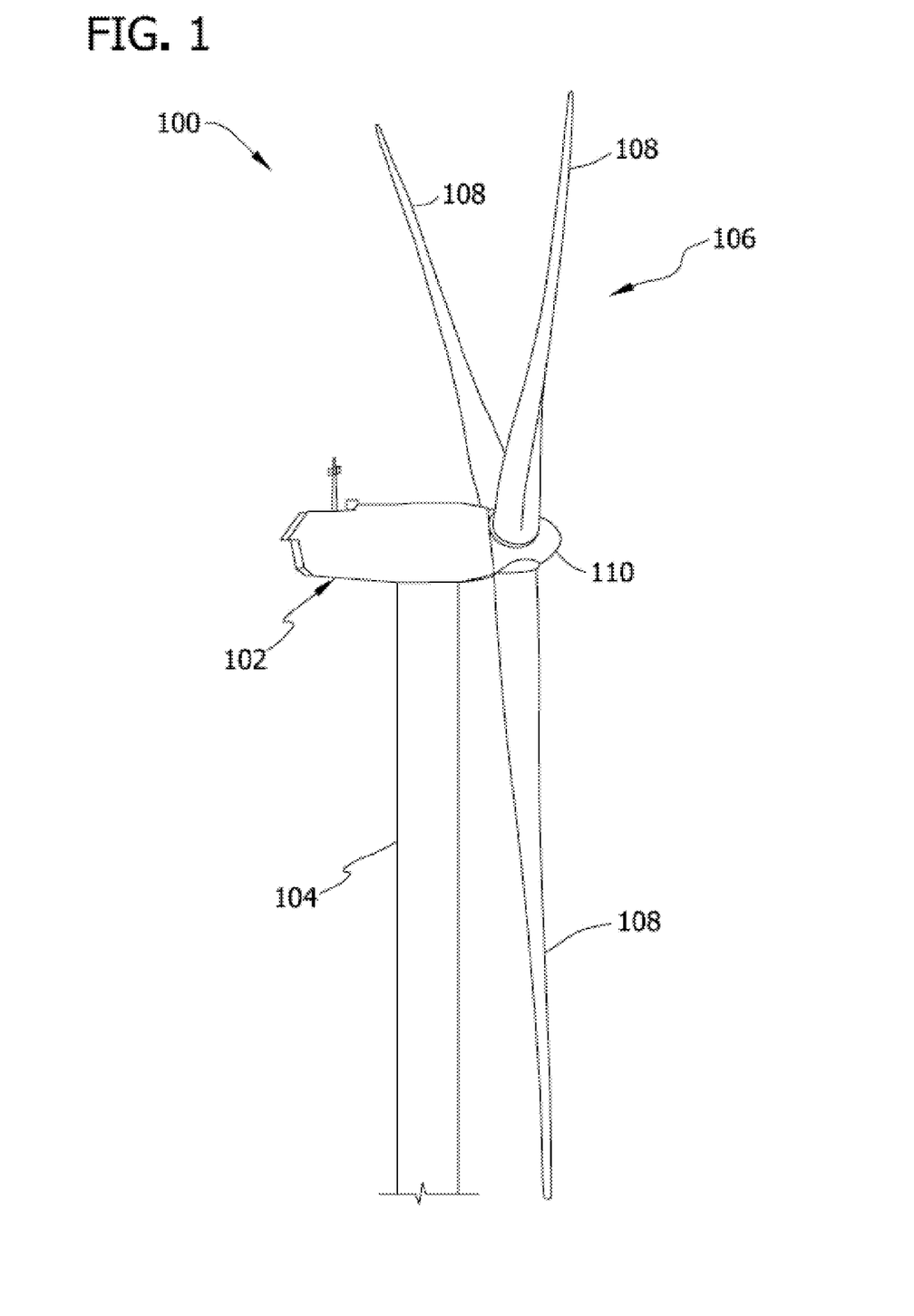
FIG. 1 is a perspective view of an exemplary wind turbine.

FIG. 1 is a perspective view of an exemplary wind turbine 100. Wind turbine 100 includes a nacelle 102 that houses a generator (not shown in FIG. 1). Nacelle 102 is mounted on a tower 104 (only a portion of tower 104 is shown in FIG. 1). Tower 104 may have any suitable height that facilitates operation of wind turbine 100 as described herein. In an exemplary embodiment, wind turbine 100 also includes a rotor 106 that includes three rotor blades 108 coupled to a rotating hub 110. Alternatively, wind turbine 100 may include any number of rotor blades 108 that enable operation of wind turbine 100 as described herein. In an exemplary embodiment, wind turbine 100 includes a gearbox (not shown) that is rotatingly coupled to rotor 106 and to the generator.

Figure 2:
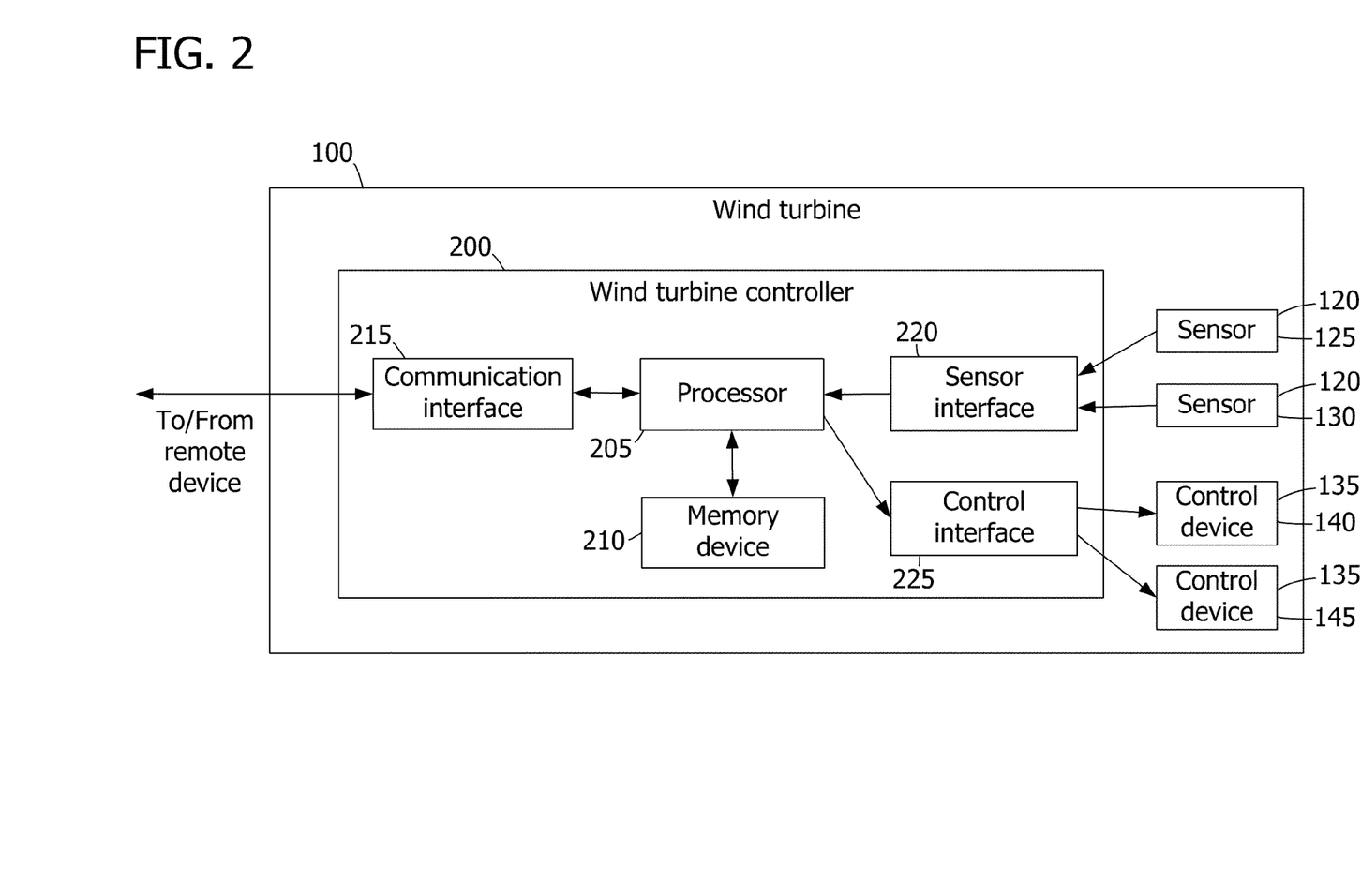
FIG. 2 is a block diagram illustrating an exemplary wind turbine controller for use with the wind turbine shown in FIG. 1.

In some embodiments, wind turbine 100 includes one or more sensors 120 and/or control devices 135 (shown in FIG. 2). Sensors 120 sense or detect wind turbine operating conditions. For example, sensor(s) 120 may include a wind speed and/or a direction sensor (e.g., an anemometer), an ambient air temperature sensor, an air density sensor, an atmospheric pressure sensor, a humidity sensor, a power output sensor, a blade pitch sensor, a turbine speed sensor, a gear ratio sensor, and/or any sensor suitable for use with wind turbine 100. Each sensor 120 is located according to its function. For example, an anemometer may be positioned on an outside surface of nacelle 102, such that the anemometer is exposed to air surrounding wind turbine 100. Each sensor 120 generates and transmits one or more signals corresponding to a detected operating condition. For example, an anemometer transmits a signal indicating a wind speed and/or a wind direction. Moreover, each sensor 120 may transmit a signal continuously, periodically, or only once, for example, though other signal timings are also contemplated.

Control devices 135 are configured to control an operation of wind turbine 100 and may include, without limitation, a brake, a relay, a motor, a solenoid, and/or a servomechanism. A control device 135 may adjust a physical configuration of wind turbine 100, such as an angle or pitch of rotor blades 108 and/or an orientation of nacelle 102 or rotor 106 with respect to tower 104.

FIG. 2 is a block diagram illustrating an exemplary wind turbine controller 200 for use with wind turbine 100. Wind turbine controller 200 includes a processor 205 for executing instructions and a memory device 210 configured to store data, such as computer-executable instructions and operating conditions.

Wind turbine controller 200 also includes a communication interface 215. Communication interface 215 is configured to be coupled in signal communication with one or more remote devices, such as another wind turbine controller 200 and/or a computing device (shown in FIG. 3).

In some embodiments, wind turbine controller 200 includes one or more sensor interfaces 220. Sensor interface 220 is configured to be communicatively coupled to one or more sensors 120, such as a first sensor 125 and a second sensor 130, and may be configured to receive one or more signals from each sensor 120. Sensor interface 220 facilitates monitoring and/or operating wind turbine 100. For example, wind turbine controller 200 may monitor operating conditions (e.g., wind speed, wind direction, rotor speed, and/or power output) of wind turbine 100 based on signals provided by sensors 120. Memory device 210 may be configured to store the operating conditions. For example, a history of operating conditions may be stored in memory device 210.

In some embodiments, wind turbine controller 200 also includes a control interface 225, which is configured to be communicatively coupled to one or more control devices 135, such as a first control device 140 and a second control device 145. In one embodiment, wind turbine control interface 225 is configured to operate control device 135 including a brake to prevent rotor 106 (shown in FIG. 1) from rotating. In addition, or in the alternative, wind turbine control interface 225 may operate a control device 135 including a blade pitch servomechanism to adjust one or more rotor blades 108 (shown in FIG. 1) to a desired and/or predetermined pitch. The brake and the blade pitch servomechanism may be operated by the same control device 135 or a first control device 135 and a second control device 135.

In some embodiments, wind turbine controller 200 is configured to operate control devices 135 to achieve a desired noise level and/or a desired power output. For example, wind turbine 100 may be operated in a curtailed state by adjusting the blade pitch to reduce power output.

Figure 3:
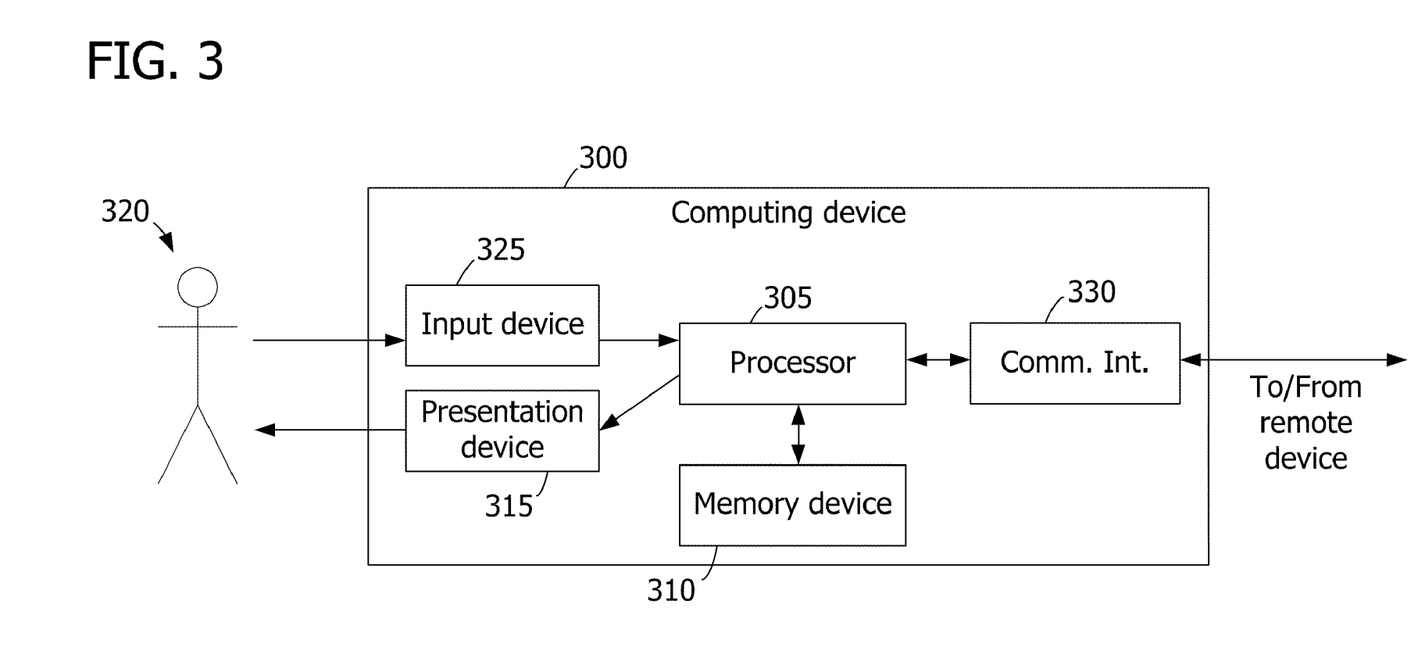
FIG. 3 is a block diagram illustrating an exemplary computing device.

FIG. 3 is a block diagram illustrating an exemplary computing device 300. Computing device 300 includes a processor 305 for executing instructions. In some embodiments, executable instructions are stored in a memory device 310. Memory device 310 is any device allowing information, such as executable instructions and/or other data, to be stored and retrieved.

In some embodiments, computing device 300 includes at least one presentation device 315 for presenting information to user 320. Presentation device 315 is any component capable of conveying information to user 320. Presentation device 315 may include, without limitation, a display device (e.g., a liquid crystal display (LCD), organic light emitting diode (OLED) display, or "electronic ink" display) and/or an audio output device (e.g., a speaker or headphones). In some embodiments, presentation device 315 includes an output adapter, such as a video adapter and/or an audio adapter. An output adapter is operatively coupled to processor 305 and configured to be operatively coupled to an output device, such as a display device or an audio output device. In some embodiments, presentation device 315 is configured to present wind turbine information, such as the possible and/or actual power output of one or more wind turbines 100 (shown in FIG. 1) to user 320.

In some embodiments, computing device 300 includes an input device 325 for receiving input from user 320. Input device 325 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 315 and input device 325. Computing device 300 also includes a communication interface 330, which is configured to be communicatively coupled to one or more wind turbine controllers 200 and/or one or more other computing devices 300.

Stored in memory device 310 are, for example, computer-readable instructions for calculating a transfer function relating power output to one or more operating conditions, calculating a possible power output, providing a user interface to user 320 via presentation device 315, and/or receiving and processing input from input device 325. In addition, or alternatively, memory device 310 may be configured to store operating conditions, power output measurements, a transfer function, and/or any other data suitable for use with the methods described herein.

Figure 4:
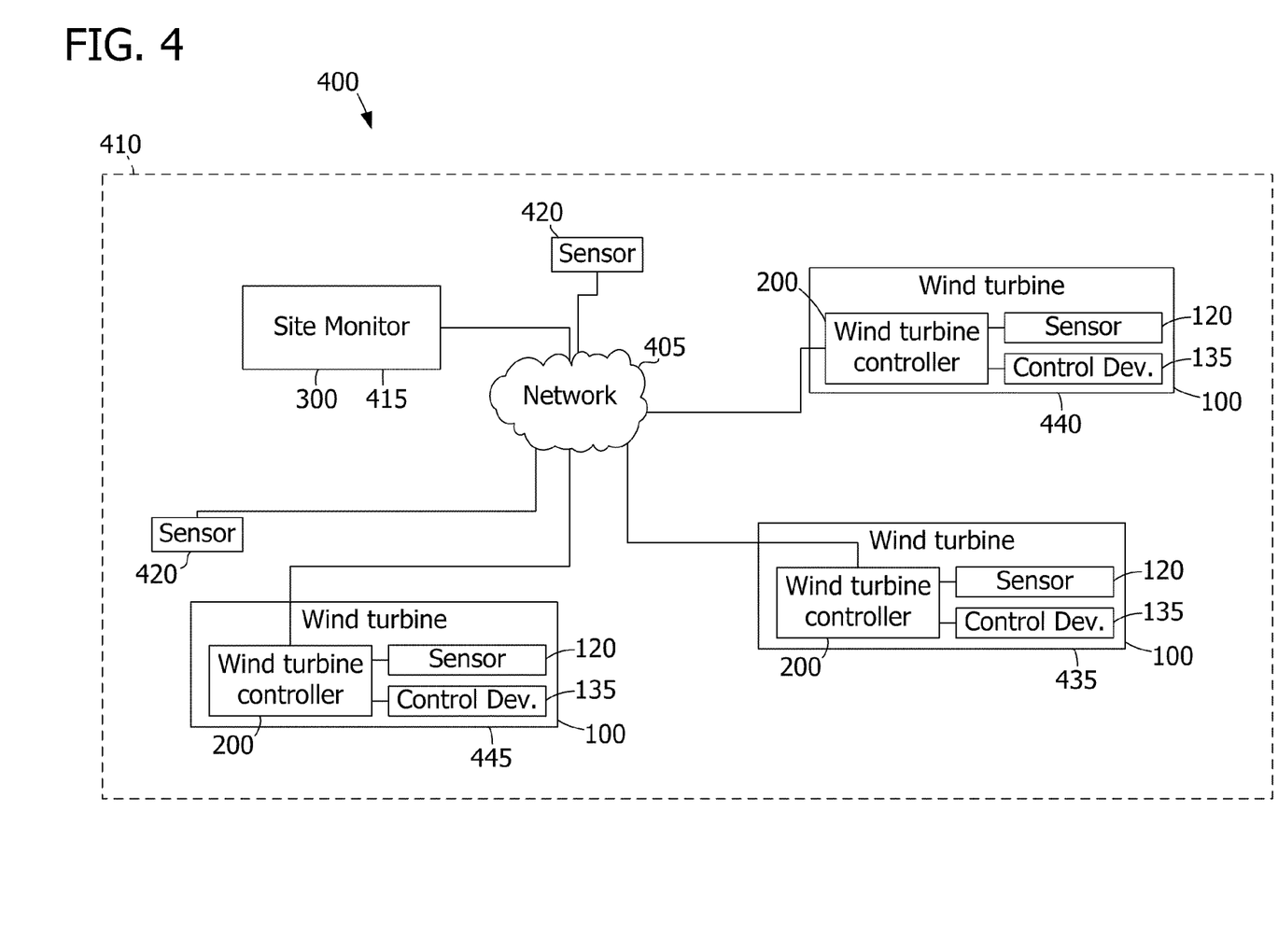
FIG. 4 is a block diagram illustrating an exemplary computing system for use in determining a possible power output of one or more wind turbines, such as the wind turbine shown in FIG. 1.

FIG. 4 is a block diagram illustrating an exemplary computing system 400 for use in determining a possible power output of one or more wind turbines 100. System 400 includes a network 405. For example, network 405 may include, without limitation, the Internet, a local area network (LAN), a wide area network (WAN), a wireless LAN (WLAN), a mesh network, and/or a virtual private network (VPN).

In an exemplary embodiment, a wind turbine site 410 includes a plurality of wind turbines 100, each of which includes a wind turbine controller 200. One or more computing devices 300 (shown in FIG. 3), such as a site monitor 415, are configured to be coupled in signal communication with wind turbine controllers 200 via network 405.

In an exemplary embodiment, site monitor 415 is positioned at wind turbine site 410. Alternatively, site monitor 415 may be positioned outside wind turbine site 410. For example, site monitor 415 may be communicatively coupled to and may interact with wind turbine controllers 200 at a plurality of wind turbine sites 410.

Each of site monitor 415 and wind turbine controller 200 includes a processor, as shown in FIGS. 2 and 3. A processor may include a processing unit, such as, without limitation, an integrated circuit (IC), an application specific integrated circuit (ASIC), a microcomputer, a programmable logic controller (PLC), and/or any other programmable circuit. A processor may include multiple processing units (e.g., in a multi-core configuration). Each of site monitor 415 and wind turbine controller 200 is configurable to perform the operations described herein by programming the corresponding processor. For example, a processor may be programmed by encoding an operation as one or more executable instructions and providing the executable instructions to the processor in a memory device (also shown in FIGS. 2 and 3) that is coupled to the processor. A memory device may include, without limitation, one or more random access memory (RAM) devices, one or more storage devices, and/or one or more computer-readable media.

In some embodiments, one or more operating condition sensors 420 are coupled in communication with site monitor 415 and/or wind turbine controllers 200 (e.g., via network 405). Operating condition sensors 420 are configured to indicate an operating condition, such as a meteorological condition at a corresponding geographic position. For example, operating condition sensors 420 may be configured to indicate a wind speed and/or a wind direction. An operating condition sensor 420 may be positioned apart from wind turbines 100 to facilitate reducing interference from wind turbines 100 with the operating condition indicated by operating condition sensor 420. For example, wind turbines 100 may affect airflow, and therefore wind speed, within the vicinity of wind turbines 100. In addition, or alternatively, it may be assumed that interference by wind turbines 100 with measured operating conditions is relatively consistent, such that methods described herein are not adversely affected by such interference.

Figure 5:
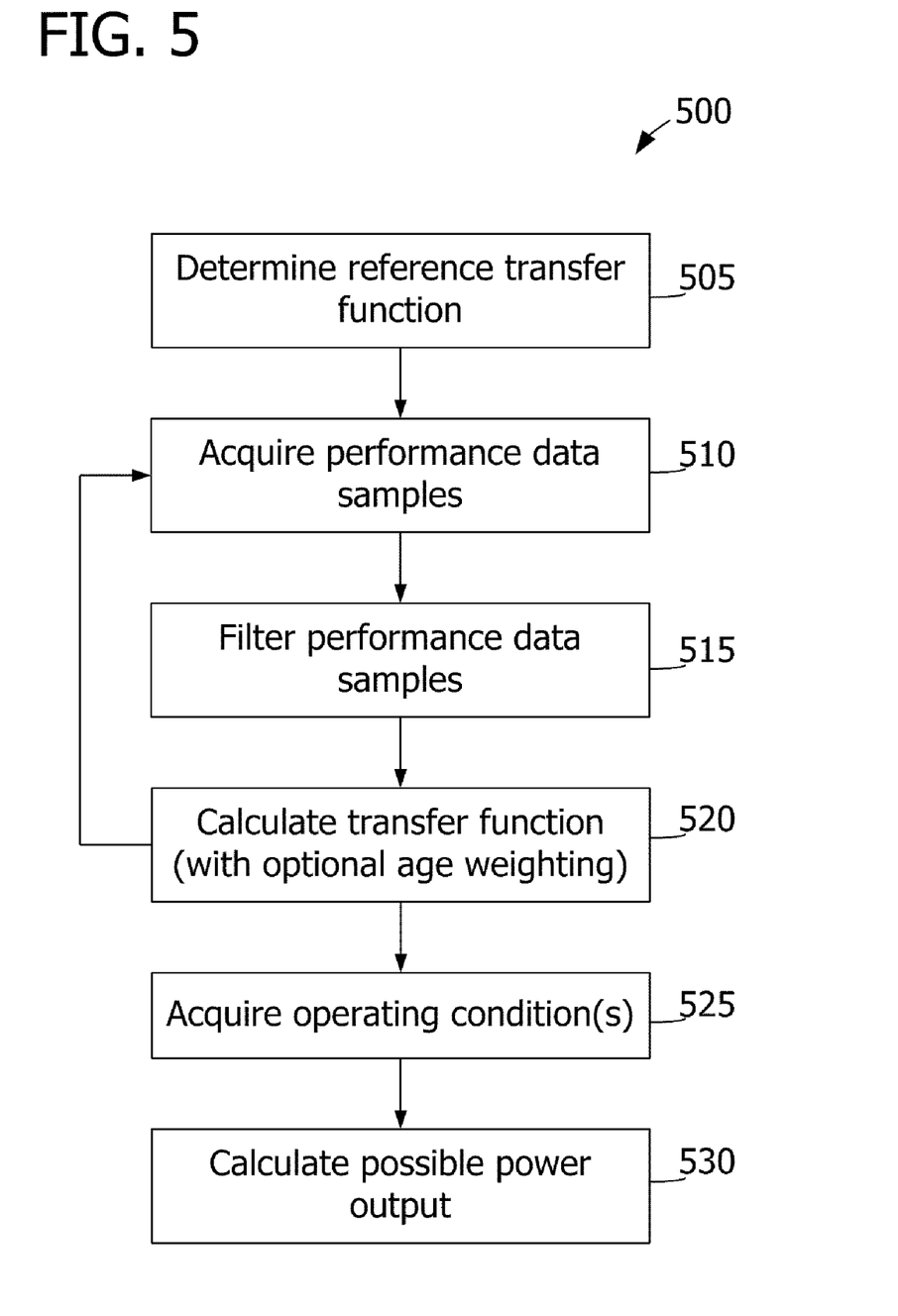
FIG. 5 is a flowchart of an exemplary method for use in calculating a possible power output of a wind turbine, such as the wind turbine shown in FIG. 1.
Figure 6:
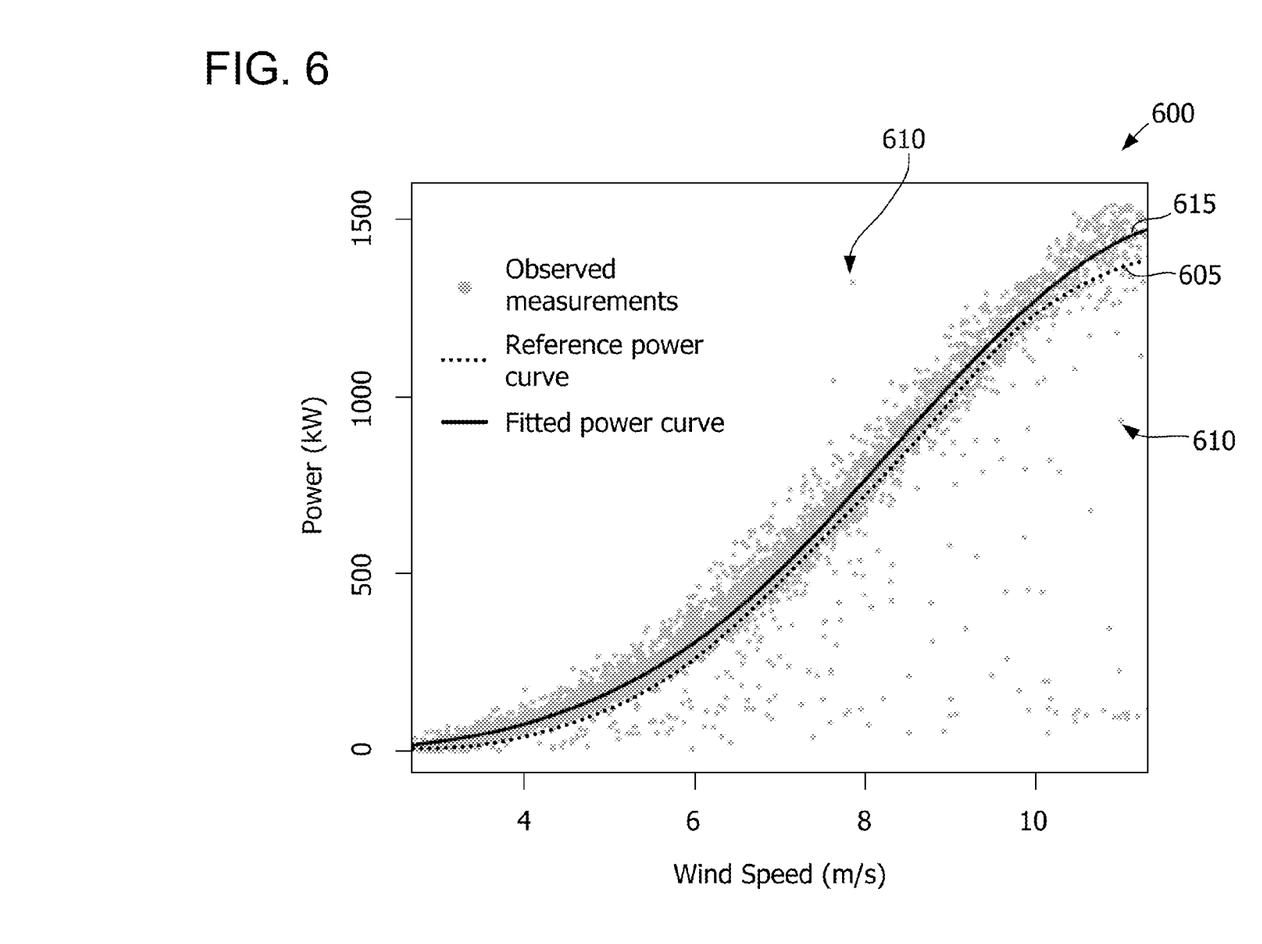
FIG. 6 is a graph illustrating power output of a wind turbine, such as the wind turbine shown in FIG. 1, relative to wind speed.

FIG. 5 is a flowchart of an exemplary method 500 for use in calculating a possible power output of a wind turbine. FIG. 6 is a graph 600 illustrating power output of a wind turbine relative to wind speed.

Referring to FIGS. 4 and 5, in the exemplary embodiment, a reference transfer function is determined 505 for a wind turbine 100. The reference transfer function may be determined 505 experimentally based on one or more wind turbines 100 that are similar to the first wind turbine. For example, wind turbines 100 may be considered similar based on having the same model designation and/or similar or identical components.

The reference transfer function represents an expected relationship between an operating condition (e.g., a meteorological condition, such as wind speed) and power output of wind turbine 100. Referring also to FIG. 6, a reference power curve 605 illustrates an expected relationship between wind speed and power output.

In operation, the power output of a wind turbine 100 may deviate from reference power curve 605 due to various factors, such as wind speed measurement errors, turbine manufacturing variations, and site-specific conditions (e.g., local geography). Wind conditions such as air density, temperature, and turbulence may also cause the actual relationship between wind speed and power output to change over time. Accordingly, method 500 facilitates creating an adaptive transfer function with parameters that are estimated from observed data.

In an exemplary embodiment, wind turbine controller 200 acquires 510 a series of performance data samples. Each performance data sample includes an operating condition (e.g., a measured wind speed, in meters/second) and a power output (e.g., in kilowatts). The operating condition and the power output are associated with a time at which the values were indicated by a sensor 120. Performance data samples are represented by data points 610 in graph 600.

In some embodiments, wind turbine controller 200 filters 515 performance data samples. For example, wind turbine controller 200 may identify statistical outliers, such as operating condition values that are more than a predetermined number of standard deviations (e.g., 3 or 5) from a mean value and/or may identify unreasonable values outside a predetermined range (e.g., a wind speed below 0 meters/second or above 20 meters/second). Such statistical outliers and unreasonable values may be filtered 515 from the acquired performance data samples and disregarded.

Wind turbine controller 200 calculates 520 a transfer function based at least in part on the performance data samples. The transfer function represents a model of wind turbine performance and relates power output to the operating condition(s) included in the performance data samples.

In the exemplary embodiment, $v_i$ and $p_i$ are wind speed and power output measurements, respectively, at time instance i. The reference transfer function is applied to the wind speeds to obtain an intermediate prediction of power output $k_i$, as shown in Equation 1.

$$k_i = f(v_i) \qquad \text{(Eq. 1)}$$

In Equation 1, $f(\ )$ represents the reference transfer function determined 505 by wind turbine controller 200. The power output may be estimated by a linear regression model using Equation 2.

$$\hat{p}_i = a_i + b_i k_i \qquad \text{(Eq. 2)}$$

In Equation 2, $\hat{p}_i$ is an estimated (or predicted) value of $p_i$. $a_i$ and $b_i$ are regression parameter values, at the end of time instance i, estimated from the data. In effect, the modified power curve model may represent the reference transfer function with a turbine-specific linear correction to the generic estimate. In one embodiment, the model parameters are initialized to the default values of $a_0=0$ and $b_0=1$. As observed, or sensor-indicated, data becomes available, wind turbine controller 200 updates the a and b parameter values, effectively learning a transfer function specific to corresponding wind turbine 100. The parameters may be estimated by an online update equation, as described below.

In an exemplary embodiment, $v_1, v_2, \ldots v_i \ldots v_n$ and $p_1, p_2, \ldots p_i \ldots, p_n$ represent the wind speed and power output measurements at time instances 1, 2, ... i ..., and n, respectively. The wind speeds are translated to generic power output estimates $k_1, k_2, \ldots k_i \ldots, k_n$ using the reference transfer function, as shown in Equation 1. According to a linear regression formulation, at the end of n time instances, the parameter values $a_n$ and $b_n$ may be estimated using a least squares solution, as shown in Equations 3 and 4.

$$b_n = \frac{SSxy_n}{SSxx_n} \quad \text{(Eq. 3)}$$

$$a_n = \overline{p}_n - b_n \overline{k}_n \quad \text{(Eq. 4)}$$

The terms in Equation 3 may be expanded as shown in Equations 5 and 6.

$$SSxy_n = \frac{1}{n}\sum_{i=1}^{n} k_i p_i - \overline{k}_n \overline{p}_n \quad \text{(Eq. 5)}$$

$$SSxx_n = \frac{1}{n}\sum_{i=1}^{n} k_i^2 - \overline{k}_n^2 \quad \text{(Eq. 6)}$$

An average of a quantity x is denoted by $\overline{x}$ (note the "bar" symbol on top of the variable). Accordingly, $\overline{k}_n$ and $\overline{p}_n$ in Equations 5 and 6 are averages of estimated power output and actual power output, respectively, at the end of n time instances. In an exemplary embodiment, such average values may be calculated using Equations 7 and 8.

$$\overline{p}_n = \frac{1}{n}\sum_{i=1}^{n} p_i \quad \text{(Eq. 7)}$$

$$\overline{k}_n = \frac{1}{n}\sum_{i=1}^{n} k_i \quad \text{(Eq. 8)}$$

Based on the definitions above, Equations 5 and 6 may be expressed as Equations 9 and 10, which include terms defined by Equations 11 and 12.

$$SSxy_n = \frac{1}{n}U_n - \overline{k}_n \overline{p}_n \quad \text{(Eq. 9)}$$

$$SSxx_n = \frac{1}{n}V_n - \overline{k}_n^2 \quad \text{(Eq. 10)}$$

$$U_n = \sum_{i=1}^{n} k_i p_i \quad \text{(Eq. 11)}$$

$$V_n = \sum_{i=1}^{n} k_i^2 \quad \text{(Eq. 12)}$$

When a performance data sample including a set of measurements $v_{n+1}$ and $p_{n+1}$ become available at time instance (n+1), wind turbine controller 200 calculates a new power output estimate $k_{n+1} = f(v_{n+1})$ using Equation 1. In order to apply Equations 3 and 4 and obtain updated values $a_{n+1}$ and $b_{n+1}$, wind turbine controller 200 calculates updated values $SSxy_{n+1}$ and $SSxx_{n+1}$. Equations 13-15 are a derivation of an exemplary function for determining $SSxy_{n+1}$.

$$SSxy_{n+1} = \frac{1}{n+1}\sum_{i=1}^{n+1} k_i p_i - \overline{k}_{n+1} \overline{p}_{n+1} \quad \text{(Eq. 13)}$$

$$SSxy_{n+1} = \frac{1}{n+1}\left(\sum_{i=1}^{n} k_i p_i + k_{n+1} p_{n+1}\right) - \overline{k}_{n+1} \overline{p}_{n+1} \quad \text{(Eq. 14)}$$

$$SSxy_{n+1} = \frac{1}{n+1}(U_n + k_{n+1} p_{n+1}) - \frac{n\overline{k}_n + k_{n+1}}{n+1}\frac{n\overline{p}_n + p_{n+1}}{n+1} \quad \text{(Eq. 15)}$$

Thus, according to Equation 15, by maintaining the values of $U_n$, $\overline{k}_n$, $\overline{p}_n$, and n, wind turbine controller 200 can compute the updated value of $SSxy_{n+1}$. The parameters $U_n$, $\overline{k}_n$, $\overline{p}_n$, and n may be referred to as auxiliary parameters.

Equation 16 is an exemplary function for determining $SSxx_{n+1}$.

$$SSxx_{n+1} = \frac{1}{n+1}[V_n + k_{n+1}^2] - \left(\frac{n\overline{k}_n + k_{n+1}}{n+1}\right)^2 \quad \text{(Eq. 16)}$$

In the exemplary embodiment, with $SSxy_{n+1}$ and $SSxx_{n+1}$ determined, wind turbine controller 200 executes Equations 3 and 4 to calculate updated model parameters $a_{n+1}$ and $b_{n+1}$. In such an embodiment, the average indicated power output $\overline{p}_n$ may be updated with a new value $p_{n+1}$ as shown in Equation 17.

$$\overline{p}_{n+1} = \frac{n\overline{p}_n + p_{n+1}}{n+1} = \left(\frac{n}{n+1}\right)\overline{p}_n + \left(\frac{1}{n+1}\right)p_{n+1} \quad \text{(Eq. 17)}$$

Some embodiments facilitate weighted averaging of $\overline{p}_n$. For example, the effect of performance data samples may be weighted based on age. Equation 18 is an exemplary function for applying age-based weighting to $\overline{p}_n$.

$$\overline{p}_{n+1} = (1-\alpha)\overline{p}_n + \alpha p_{n+1} \quad \text{(Eq. 18)}$$

In Equation 18, $\alpha$ is a constant, chosen from the range of zero to one, that represents a "forgetting factor", and causes older indicated values to have progressively less and less influence on the model parameters. Such weighting may be incorporated into any functions that include average values (e.g., Equations 15 and 16, which include $U_n$ and $V_n$). Applying age-based weighting enables the transfer function calculated 520 by wind turbine controller 200 to "track" changes in the relationship between power output and wind speed by giving higher weight to more recent observations.

Higher values of $\alpha$ (i.e., closer to 1) may be selected to cause the model to quickly adapt to the observed power curve. Very low values of $\alpha$, on the other hand, may restrict how quickly the model adapts to changes in the relationship between an operating condition and power output. In some embodiments, $\alpha$ is selected based on how quickly such changes are expected to occur at site 410.

Referring again to FIG. 6, a fitted power curve 615 represents the calculated power transfer function. As shown in FIG. 6, fitted power curve 615 tracks data points 610 more closely than reference power curve 605 does. Further, the calculations described above require wind turbine controllers 200 to store calculated values, as opposed to a large collection of raw data. Accordingly, an accurate, wind turbine-specific transfer function may be provided without imposing significant data storage requirements on wind turbine controllers 200.

In the exemplary embodiment, wind turbine controller 200 calculates 520 the transfer function based on performance data samples acquired 510 at times when wind turbine 100 is operated in a normal, non-curtailed state. As such, the calculated transfer function represents the relationship between a maximum power output of wind turbine 100 and an operating condition.

At another time when wind turbine 100 is operated in a curtailed state (e.g., by adjusting a blade pitch to reduce power output), wind turbine controller 200 acquires 525 one or more operating conditions that correspond to the operating conditions used to calculate 510 the transfer function. In some embodiments, acquiring 525 an operating condition includes acquiring 525 a plurality of samples of the operating condition and calculating an average of the sampled values The operating condition samples may be filtered, as described above with respect to filtering 515 performance data samples.

Wind turbine controller 200 calculates 530 a possible power output for the time corresponding to the operating condition(s) acquired 525 by wind turbine controller 200 based on the transfer function and the acquired operating condition(s). The possible power output represents an estimated power output that would have been produced by wind turbine 100 at the time corresponding to the operating condition(s) if wind turbine 100 had been operated in a non-curtailed state.

While the description above refers specifically to wind speed, the methods provided herein are operable with any operating conditions affecting power output of wind turbine 100. Further, such operating conditions may be combined into a compound operating condition. For example, a wind force may be calculated at least in part by multiplying wind speed by air density.

Figure 7:
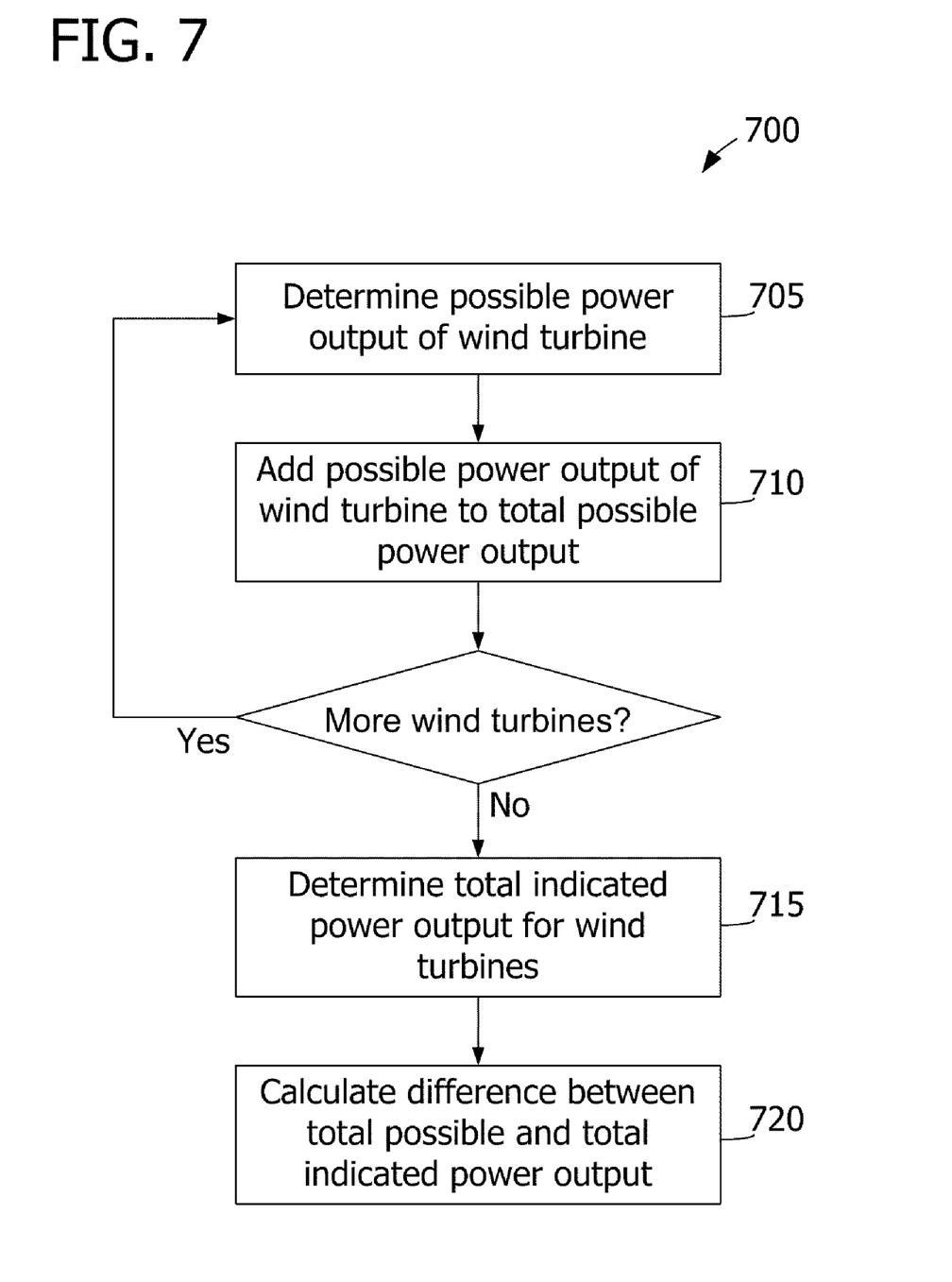
FIG. 7 is a flowchart of an exemplary method for determining a difference between actual power output and possible power output of the wind turbine site shown in FIG. 4.

FIG. 7 is a flowchart of an exemplary method 700 for determining a difference between actual power output and possible power output of wind turbine site 410. Referring to FIGS. 4 and 7, in an exemplary embodiment, method 700 is performed by site monitor 415 and/or wind turbine controllers 200.

For each wind turbine 100 in site 410, a possible power output of wind turbine 100 is determined 705. For example, each wind turbine controller 200 may calculate 500 (shown in FIG. 5) a possible power output of a corresponding wind turbine 100 and transmit the possible power output of wind turbine 100 to site monitor 415. Alternatively, site monitor 415 may receive performance data samples and/or operating conditions from one or more wind turbine controllers 200 and calculate 500 the possible power output.

The possible power output of each wind turbine 100 is added 710 to a total possible power output, and a total indicated power output for wind turbines 100 is determined 715. For example, site monitor 415 may receive an indicated power output from each wind turbine controller 200 and add the received power outputs to calculate a total indicated power output. Alternatively, site monitor 415 may receive an indication of a total power output from a sensor 420. For example, the total power output may be indicated at a point where wind turbines 100 are coupled to a transmission line and/or an electrical grid (not shown).

Site monitor 415 calculates 720 the difference between the total possible power output and the total indicated power output. In one embodiment, site monitor 415 calculates 720 the difference between the total possible power output and the total indicated power output for a duration in which wind turbines 100 are operated in a curtailed state.

The difference calculated 720 by site monitor 415 represents an excess power output capacity of site 410. In some embodiments, the excess capacity may be used to determine compensation that is due to the site operator as a result of curtailing operation of wind turbines 100.

Embodiments provided herein facilitate efficiently updating a transfer function relating power output of a wind turbine to one or more operating conditions as new measurement data becomes available, without requiring all historical measurements to be stored. Accordingly, the accuracy of possible power output estimations for the wind turbine may be increased. Further, the methods provided herein may be practiced with respect to a plurality of wind turbines in a wind turbine site to determine a total possible power output of the site.

While the embodiments described illustrate the use of an online, adaptive transfer function learning model, other methods may be used in combination with or in the alternative to the methods described. For example, the transfer function parameters may be updated using recursive least squares, neural networks, and/or adaptive filter techniques.

The methods described herein may be encoded as executable instructions embodied in a computer-readable medium including, without limitation, a memory device of a computing device. Such instructions, when executed by a processor, cause the processor to perform at least a portion of the methods described herein.

Exemplary embodiments of a wind turbine control system are described above in detail. The system, devices, wind turbine, and included assemblies are not limited to the specific embodiments described herein, but rather each component may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for use in calculating a possible power output of a wind turbine, the method comprising:
acquiring a series of performance data samples, wherein each performance data sample of the plurality of performance data samples includes a meteorological condition and a power output indicated at a first time by one or more sensors associated with a wind turbine;
calculating by a computing system a transfer function based at least in part on the series of performance data samples, wherein the transfer function relates power output to the meteorological condition; and,
calculating by the computing system a possible power output based on the transfer function and at least one meteorological condition indicated by the sensors at a second time.

2. A method in accordance with claim 1, wherein calculating a transfer function comprises calculating a transfer function that relates power output to wind speed, and calculating a possible power output comprises calculating a possible power output based at least in part on a wind speed indicated by a wind speed sensor.

3. A method in accordance with claim 2, wherein calculating a transfer function comprises calculating a transfer function that further relates power output to air density, and calculating a possible power output comprises calculating a possible power output based further on an air density.

4. A method in accordance with claim 1, wherein acquiring the series of performance data samples comprises acquiring performance data samples while the wind turbine is operated in a non-curtailed state.

5. A method in accordance with claim 1, wherein calculating a possible power output comprises calculating a possible power output based on a meteorological condition that is indicated while the wind turbine is operated in a curtailed state.

6. A method in accordance with claim 1, wherein calculating a transfer function based on the series of performance data samples comprises weighting each performance data sample of the series of performance data samples based on an age of the performance data sample.

7. A method in accordance with claim 1, wherein the wind turbine is a first wind turbine, and calculating a transfer function comprises modifying a reference transfer function that is based on one or more wind turbines that are similar to the first wind turbine.

8. A method in accordance with claim 1, wherein the possible power output is an individual possible power output of a first wind turbine of a plurality of wind turbines, the method further comprising:
 calculating a transfer function corresponding to each wind turbine of the plurality of wind turbines based on a series of performance data samples associated with the wind turbine;
 calculating an individual possible power output of each wind turbine based on the corresponding transfer function and the meteorological condition indicated at the second time; and,
 calculating a total possible power output of the plurality of wind turbines based on the individual possible power outputs.

9. A device for use in calculating a possible power output of a wind turbine, the device comprising:
 a sensor interface configured to receive an operating condition and a power output at a plurality of first times from one or more sensors associated with a wind turbine;
 a memory device coupled in communication with the sensor interface and configured to store a series of performance data samples that include an operating condition and a power output; and,
 a processor coupled in communication with the memory device and programmed to:
  calculate a transfer function relating power output to the operating condition based at least in part on the series of performance data samples; and,
  calculate a possible power output based on the transfer function and an operating condition received by the sensor interface at a second time.

10. A device in accordance with claim 9, wherein the processor is programmed to calculate the transfer function based at least in part on performance data samples corresponding to first times at which the wind turbine is operated in a non-curtailed state.

11. A device in accordance with claim 10, wherein the processor is programmed to calculate the possible power output based on an operating condition received at a second time at which the wind turbine is operated in a curtailed state.

12. A device in accordance with claim 9, wherein the processor is programmed to calculate a transfer function by calculating a transfer function relating power output to at least one meteorological condition.

13. A device in accordance with claim 9, wherein the processor is programmed to calculate a transfer function at least in part by weighting each performance data sample of the plurality of data samples based on an age of the performance data sample.

14. A device in accordance with claim 9, further comprising a communication interface coupled to the processor and configured to transmit the possible power output to a site monitor, wherein the site monitor calculates a total possible power output for a plurality of wind turbines in a site based at least in part on the transmitted possible power output.

15. One or more non-transitory computer-readable storage media having computer-executable instructions embodied thereon, wherein when executed by at least one processor, the computer-executable instructions cause at least one processor to:
 calculate a transfer function relating power output of a wind turbine to a meteorological condition based at least in part on a series of performance data samples, wherein each performance data sample of the series of performance data samples includes a power output of the wind turbine and a meteorological condition of the wind turbine that are indicated while the wind turbine is operated in a non-curtailed state; and,
 calculate a possible power output of the wind turbine based at least in part on the transfer function and a meteorological condition of the wind turbine indicated while the wind turbine is operated in a curtailed state.

16. One or more non-transitory computer-readable storage media in accordance with claim 15, wherein when executed by the processor, the computer-executable instructions further cause the processor to:
 calculate a transfer function associated with each wind turbine of a plurality of wind turbines based at least in part on a series of performance data samples corresponding to each wind turbine; and,
 calculate a possible power output of each wind turbine based at least in part on the transfer function associated with the wind turbine and a meteorological condition indicated while the wind turbine is operated in a curtailed state.

17. One or more non-transitory computer-readable storage media in accordance with claim 16, wherein when executed by the processor, the computer-executable instructions further cause the processor to calculate a total possible power output based on the calculated possible power output of each wind turbine.

18. One or more non-transitory computer-readable storage media in accordance with claim 17, wherein when executed by the processor, the computer-executable instructions further cause the processor to calculate a difference between the total possible power output and a total indicated power output of the plurality of wind turbines.

19. One or more non-transitory computer-readable storage media in accordance with claim 15, wherein when executed by the processor, the computer-executable instructions further cause the processor to calculate a difference between the possible power output of the wind turbine and an indicated power output of the wind turbine.

20. One or more non-transitory computer-readable storage media in accordance with claim 15, wherein when executed by the processor, the computer-executable instructions cause the processor to calculate a transfer function by calculating a transfer function relating power output of the wind turbine to wind speed.

* * * * *